(12) United States Patent
Tsai

(10) Patent No.: US 9,638,983 B2
(45) Date of Patent: May 2, 2017

(54) PHOTOGRAPHING DEVICE AND FOCUS ADJUSTING SEAT THEREOF HAVING AT LEAST ONE GUIDE GROOVE MOVABLY ASSEMBLED WITH AT LEAST ONE GUIDE BAR

(71) Applicant: VIVOTEK INC., New Taipei (TW)

(72) Inventor: Chiung-Wei Tsai, New Taipei (TW)

(73) Assignee: VIVOTEK INC., New Taipei (TW)

( * ) Notice: Subject to any disclaimer, the term of this patent is extended or adjusted under 35 U.S.C. 154(b) by 426 days.

(21) Appl. No.: 14/463,356

(22) Filed: Aug. 19, 2014

(65) Prior Publication Data

US 2015/0053845 A1  Feb. 26, 2015

(30) Foreign Application Priority Data

Aug. 22, 2013  (TW) .............................. 102130066 A

(51) Int. Cl.
*G03B 3/10* (2006.01)
(52) U.S. Cl.
CPC ..................................... *G03B 3/10* (2013.01)
(58) Field of Classification Search
CPC .......... G02B 7/023; G02B 23/16; G03B 3/10; G03B 2205/0007; G03B 5/00; H04N 5/2253
USPC .............................................. 250/239, 208.1
See application file for complete search history.

(56) References Cited

U.S. PATENT DOCUMENTS 4,264,168 A  *  4/1981  Baliozian ............... G03B 15/10
352/89

FOREIGN PATENT DOCUMENTS

| CN | 101938600 B | 9/2012 |
|---|---|---|
| CN | 202713468 U | 1/2013 |
| CN | 203014962 U | 6/2013 |

\* cited by examiner

*Primary Examiner* — Que T Le
(74) *Attorney, Agent, or Firm* — Maschoff Brennan

(57) ABSTRACT

A focus adjusting seat includes a base seat, at least one guide bar, a driving device and an image sensor adjusting seat. The base seat includes a bottom plate and a front plate connected to the bottom plate and having a lens installation hole. Two ends of the at least one guide bar are disposed on the bottom plate, respectively. The driving device is disposed on the bottom plate and has an output screw. The image sensor adjusting seat includes a bottom seat and an image sensor installation part connected to the bottom seat and facing toward the lens installation hole. The bottom seat has a screwed part screwed to the output screw and at least one guide groove movably assembled with at least one guide bar. The driving device is adapted to adjust a relative position between the image sensor adjusting seat and the lens installation hole.

19 Claims, 5 Drawing Sheets

PHOTOGRAPHING DEVICE AND FOCUS ADJUSTING SEAT THEREOF HAVING AT LEAST ONE GUIDE GROOVE MOVABLY ASSEMBLED WITH AT LEAST ONE GUIDE BAR

CROSS-REFERENCE TO RELATED APPLICATIONS

This non-provisional application claims priority under 35 U.S.C. §119(a) on Patent Application No(s). 102130066 filed in Taiwan, R.O.C. on Aug. 22, 2013, the entire contents of which are hereby incorporated by reference.

BACKGROUND

Technical Field

The disclosure relates to a photographing device. More particularly, the disclosure relates to a photographing device which comprises a focus adjusting seat.

Background

With the development of technology, a surveillance camera is widely used in security monitoring. For example, the surveillance camera is necessary for personal safety and property protection in families, companies, government agencies, and even general public places. Generally speaking, the surveillance camera may monitor actions in a monitored environment to capture every event.

In prior art, the surveillance camera comprises a lens module. The lens module may be a fixed-focus lens, a variable-focus lens, etc. The structure of the fixed-focus lens is smaller in size and lighter in weight, the image quality of the fixed-focus lens is better, and the fixed-focus lens is cheaper, so the fixed-focus lens has been widely used by consumers. However, the focal length of the fixed-focus lens may not be adjusted by the consumers, so that the usage of the fixed-focus lens is limited. Additionally, even the surveillance camera comprises the variable-focus lens with its focal length can be adjusted by the consumers, but the precision of the variable focus of the surveillance camera may not be upgraded to match a new surveillance camera with high pixel densities which was developed. Accordingly, the image quality of the new surveillance camera may not be enhanced and affected due to the poor variable-focus precision. To sum up, it is necessary to improve the problem of the focal length of the fixed-focus lens which may not be adjusted and provide a focal length adjustment method with a high precision of the variable focus.

SUMMARY

One aspect of the disclosure provides a focus adjusting seat which comprises a base seat, at least one guide bar, a driving device and an image sensor adjusting seat. The base seat comprises a bottom plate and a front plate. The front plate is connected to the bottom plate and has a lens installation hole. Two ends of the at least one guide bar are disposed on the bottom plate, respectively. The driving device is disposed on the bottom plate and has an output screw. The image sensor adjusting seat comprises a bottom seat and an image sensor installation part. The image sensor installation part is connected to the bottom seat and faces toward the lens installation hole. The bottom seat has a screwed part and at least one guide groove. The output screw is screwed to the screwed part. The at least one guide groove is movably assembled with the at least one guide bar. The driving device is adapted to adjust a relative position between the image sensor adjusting seat and the lens installation hole.

In another aspect of the disclosure provides a photographing device which comprises the said focus adjusting seat and an image sensor. The image sensor is disposed on a surface of the image sensor installation part of the focus adjusting seat. The surface of the image sensor installation part faces toward the front plate.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
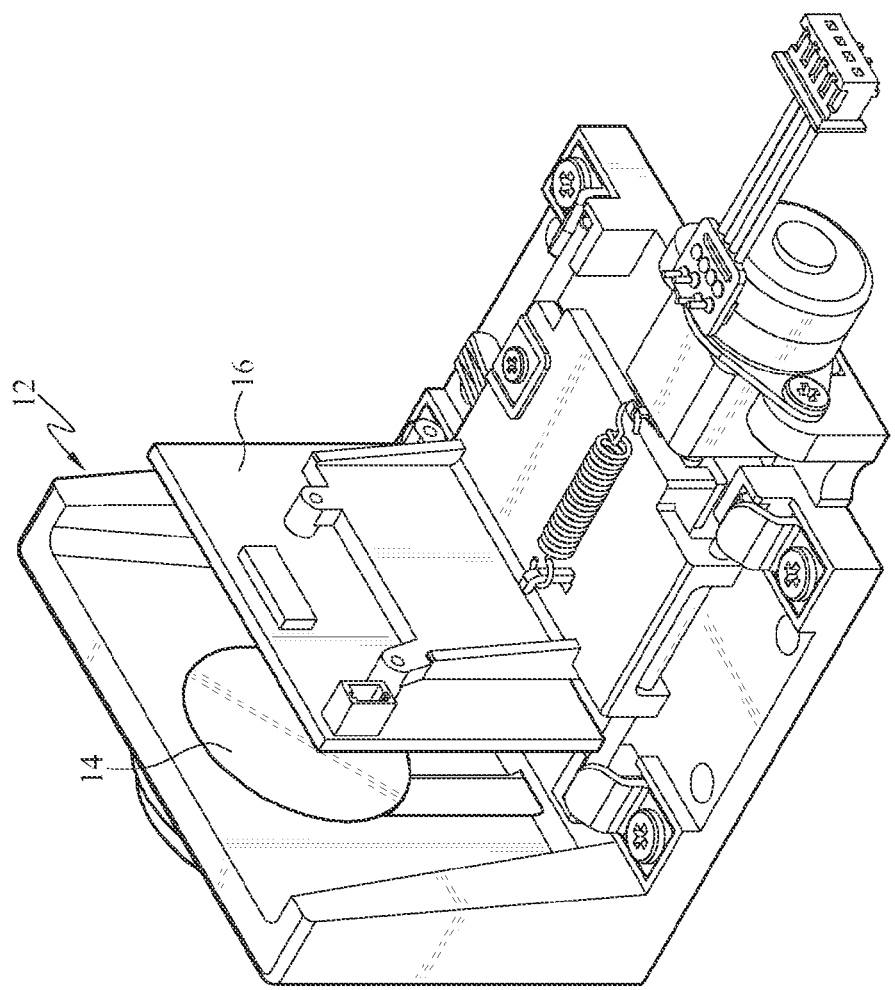
FIG. 1 is a perspective view of a photographing device according to a first embodiment of the disclosure.
Figure 2:
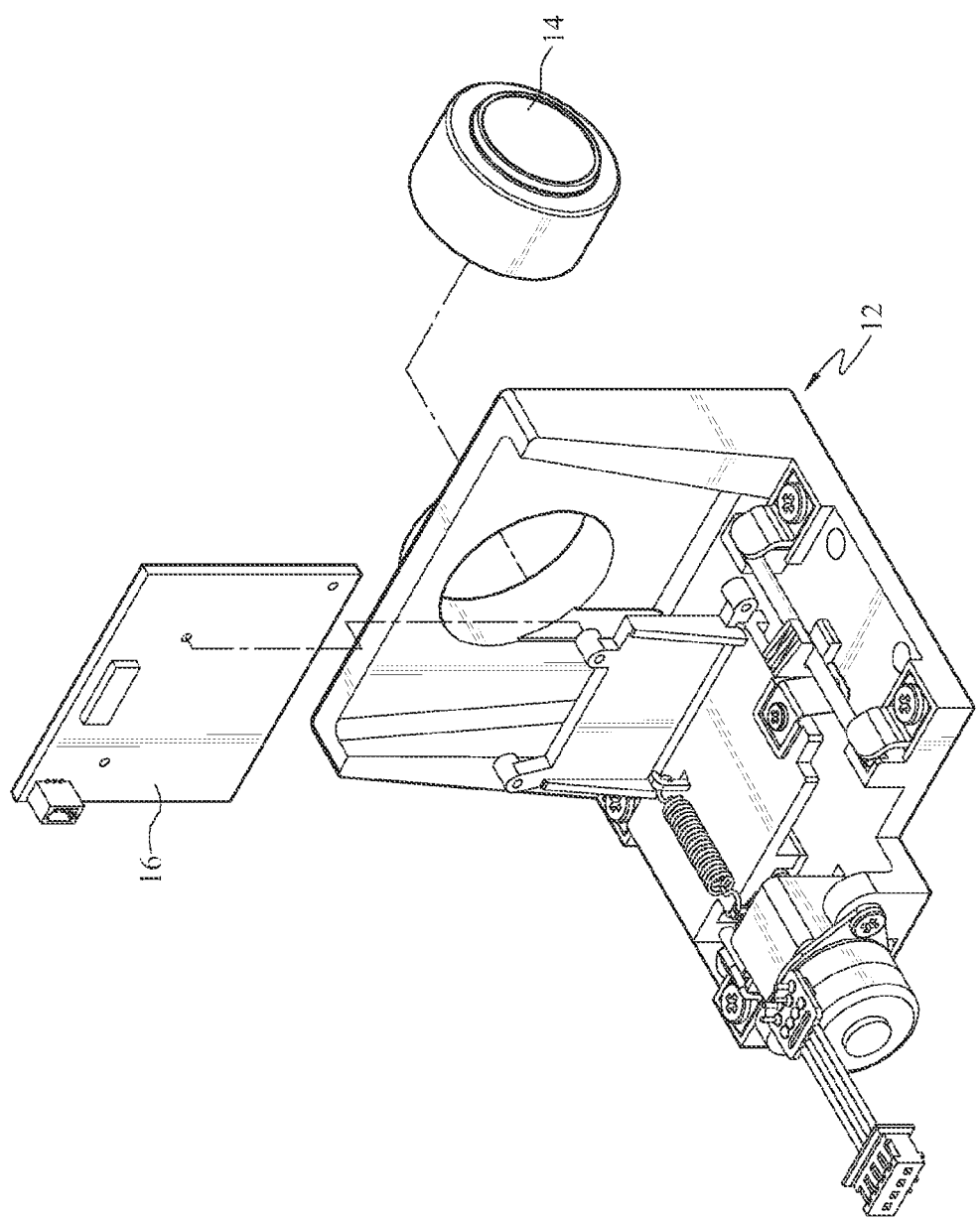
FIG. 2 is an exploded view of the photographing device in FIG. 1.

Please refer to FIG. 1 and FIG. 2. FIG. 1 is a perspective view of a photographing device according to a first embodiment of the disclosure. FIG. 2 is an exploded view of the photographing device in FIG. 1. In this embodiment, the photographing device 10 comprises a focus adjusting seat 12, a lens 14 and an image sensor main plate 16. At least one image sensor (not shown in FIGs.) is disposed on the image sensor main plate 16. The lens 14 and the image sensor main plate 16 are detachably disposed on the focus adjusting seat 12, respectively.

Figure 3:
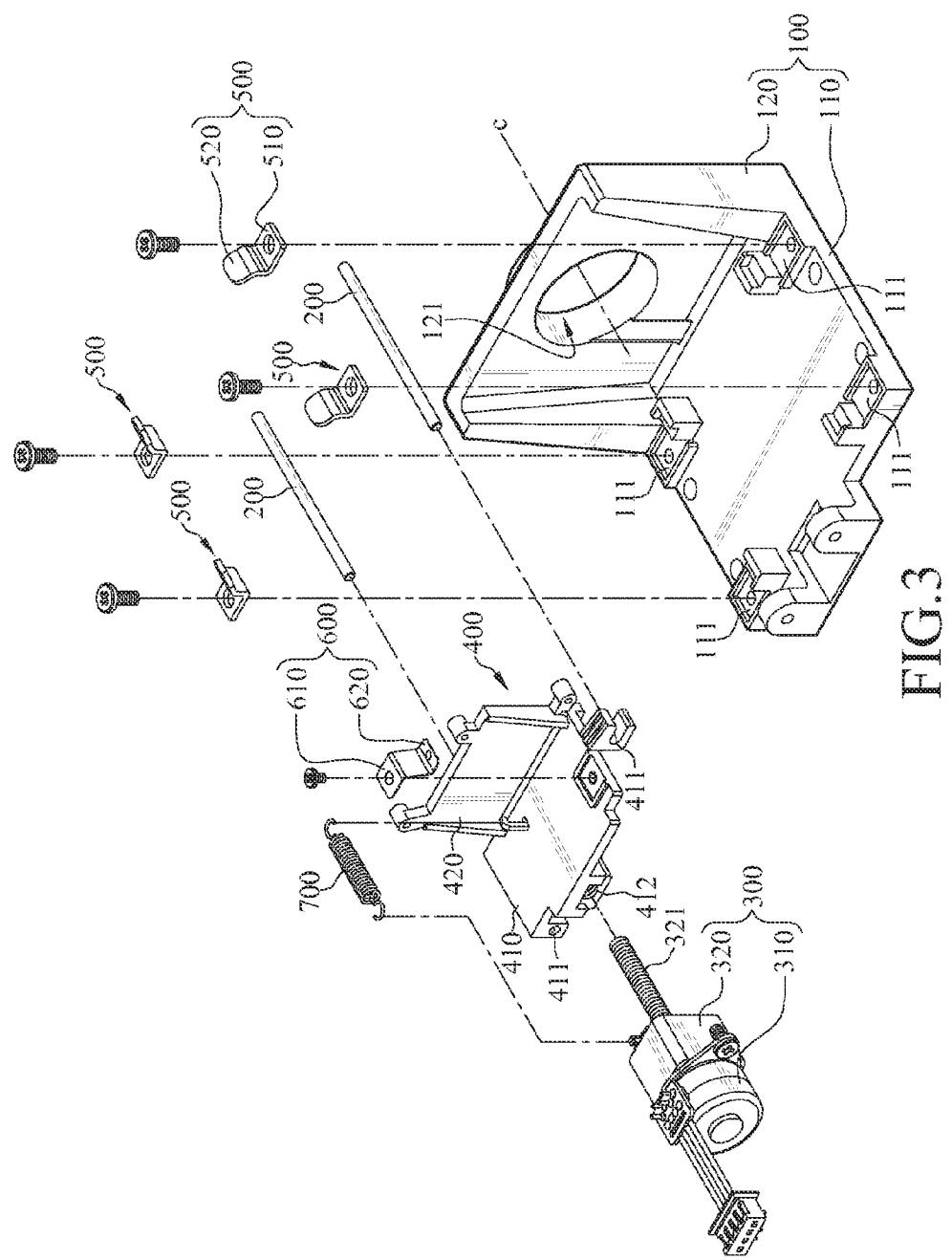
FIG. 3 is an exploded view of a focus adjusting seat in FIG. 1.
Figure 4:
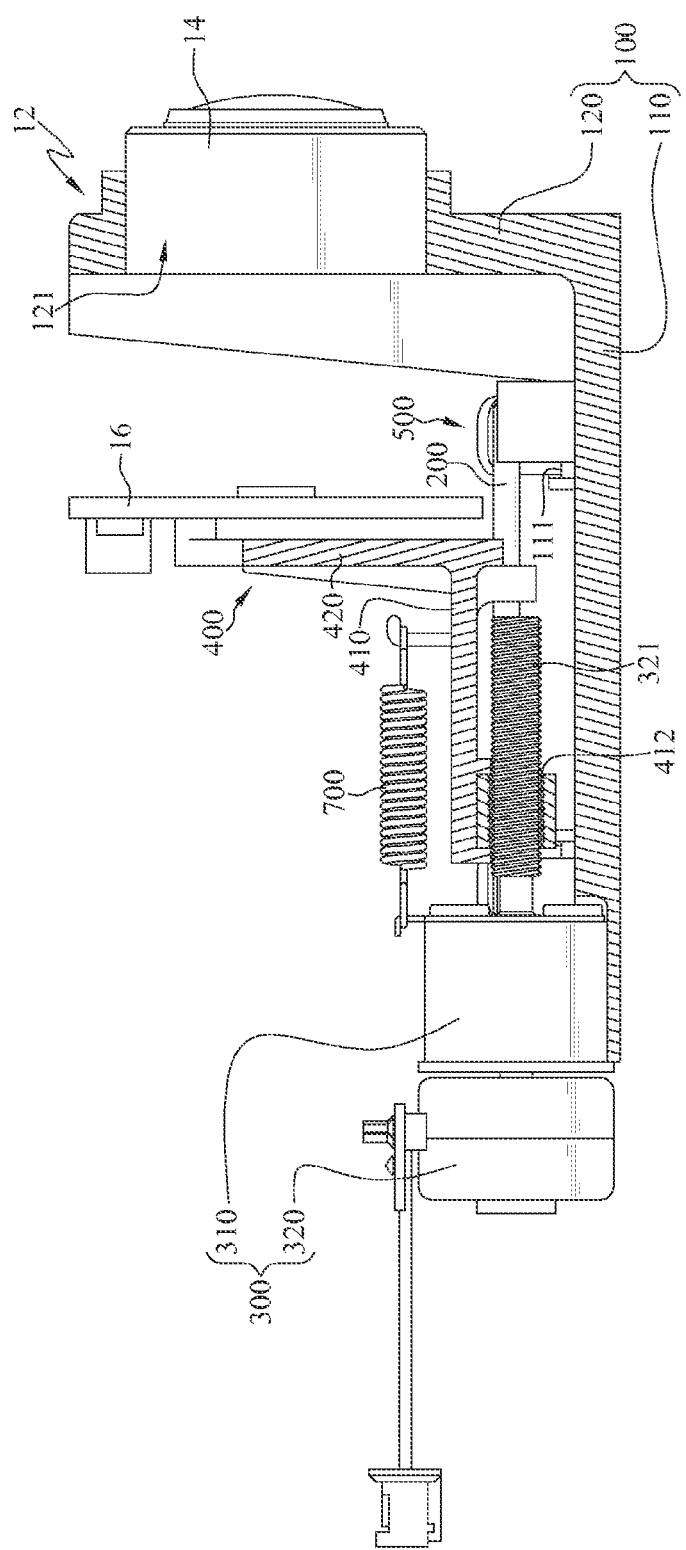
FIG. 4 is a sectional view of the focus adjusting seat in FIG. 3.

Please refer to FIG. 3 and FIG. 4. FIG. 3 is an exploded view of a focus adjusting seat in FIG. 1. FIG. 4 is a sectional view of the focus adjusting seat in FIG. 3. In this embodiment, the focus adjusting seat 12 comprises a base seat 100, two guide bars 200, a driving device 300, an image sensor adjusting seat 400, four first contact springs 500 and a second contact spring 600. The base seat 100 comprises a bottom plate 110 and a front plate 120. The bottom plate 110 has four fixed parts 111. The front plate 120, connected to the bottom plate 110, has a lens installation hole 121. A central axis C of the lens installation hole 121 is parallel to the bottom plate 110. The lens 14 is detachably disposed at the lens installation hole 121, so that an optical axis of the lens 14 and the central axis C of the lens installation hole 121 are parallel or coaxial to each other. Additionally, the bottom plate 110 and the front plate 120 are formed integrally into a single unit in this embodiment. For example, the bottom plate 110 and the front plate 120 may be formed integrally into a single unit by molding or mechanical processing (by a CNC machine). Additionally, the bottom plate 110 and the front plate 120 also may be formed integrally into a single unit by molding and mechanical processing at the same time. In other words, the bottom plate 110 and the front plate 120 may be processed according to a same reference point (as a same positional reference), to improve the processing accuracy. For example, since the lens installation hole 121 and the four fixed parts 111 are processed according to the same positional reference, the processing accuracy of intervals between the lens installation hole 121 and the four fixed parts 111 are significantly improved. Furthermore, since the four fixed parts 111 are processed according to the same positional reference, the heights of the four fixed parts 111 are manufactured to be the same, so as to prevent from affecting the expected function of the focus adjusting seat 12 after the four fixed parts 111 are assembled.

Two ends of the one guide bar 200 are disposed on the two fixed parts 111 of the bottom plate 110 respectively, and two ends of the other guide bar 200 are also disposed on the other two fixed parts 111 of the bottom plate 110 respectively. In this embodiment, the quantity of the guide bar 200 is two. However, in other embodiments, the quantity of the guide bar 200 may be one or more than three. Additionally, the quantity of the first contact spring 500 may be, but not limited to, four. In other embodiments, the quantity of the first contact spring 500 may be one or more than one.

The driving device 300 is disposed on the bottom plate 110 and comprises a stepping motor 310 and a deceleration gear box 320. The deceleration gear box 320 is disposed between the stepping motor 310 and an output screw 321. The stepping motor 310 is adapted to drive the deceleration gear box 320 to rotate, such that the output screw 321 is driven to rotate, accordingly. Because the deceleration gear box 320 provides a reduction ratio, the rotational accuracy of the output screw 321 may be improved by the stepping motor 310 and the deceleration gear box 320. For example, when the stepping angle of the stepping motor 310 is 18 degrees per step, the pitch of the output screw 321 is 0.5 millimeter (mm), the accuracy per step of the stepping motor 310 is 0.025 mm (the equation is: 0.5*18/360=0.025). When the stepping motor 310 comprises the deceleration gear box 320 providing a reduction ratio equal to 1:96, the accuracy per step of the stepping motor 310 is 0.00026 mm (that is, (0.5*18/360)/96). Accordingly, if the stepping motor 310 comprises the deceleration gear box 320, the accuracy per step of the stepping motor may be obviously improved.

The image sensor adjusting seat 400 comprises a bottom seat 410 and an image sensor installation part 420 which are connected to each other. Two sides opposite to each other of the bottom seat 410 have two guide grooves 411, respectively. The bottom of the bottom seat 410 has a screwed part 412. The two guide grooves 411 are movably assembled with the two guide bars 200, respectively. The image sensor installation part 420 faces toward the lens installation hole 121. Additionally, the optical axis of the lens 14 penetrates the image sensor installation part 420. The image sensor main plate 16 is detachably disposed on a surface of the image sensor installation part 420 of the focus adjusting seat 12 which faces toward the front plate 120. Accordingly, the image sensor (not shown in FIGs.) disposed on the image sensor main plate 16 may be adapted to capture images from the lens 14. The guide grooves 411 may be through holes surrounding the guide bar 200, or recesses not surrounding the guide bar 200. When the guide grooves 411 are the through holes, the assembly accuracy of the guide grooves 411 and the guide bar 200 may be improved. In this embodiment, one of the two guide grooves 411 is the through hole, and the other guide groove 411 is the recess. However, in other embodiments, the two guide grooves 411 may be two through holes, two recesses, or one through hole and one recess at the same time.

The output screw 321 is screwed to the screwed part 412, for adjusting a relative position between the image sensor adjusting seat 400 and the lens installation hole 121, and for further adjusting a relative position between the image sensor (not shown in FIGs.) disposed on the image sensor adjusting seat 400 and the lens 14 disposed at the lens installation hole 121. Accordingly, the focal length of the photographing device 10 is capable of being adjusted.

In this embodiment, the bottom seat 410 and the image sensor installation part 420 are formed integrally into a single unit by molding or mechanical processing (by a CNC machine). Additionally, the bottom seat 410 and the image sensor installation part 420 also may be formed integrally into a single unit by molding and mechanical processing at the same time. Accordingly, the processing accuracy of the image sensor adjusting seat 400 may be improved.

Each first contact spring 500 has a first fixed section 510 and a pressed section 520. The four first fixed sections 510 are disposed on the four fixed parts 111, respectively. Each two ends of the two guide bars 200 are interposed between the four pressed sections 520 and four fixed parts 111, respectively. In other words, the two ends of each guide bar 200 are interposed between each pressed section 520 and each fixed part 111, respectively. The pressed sections 520 are adapted to press the guide bars 200 toward and against the fixed part 111, normally, so that each axis of each guide bars 200 is parallel to the bottom plate 110. However, the quantity of the first contact spring 500 may be, but not limited to, four. The quantity of the first contact spring 500 may be determined according to the quantity of the guide bar 200. In other words, when the quantity of the guide bar 200 is one, accordingly, the quantity of the first contact spring 500 is two.

The second contact spring 600 has a second fixed section 610 and a support section 620. The second fixed section 610 is disposed on a surface of the bottom seat 410 which faces backward to the surface of the bottom plate 110. The support section 620, which is located between the at least one guide bar 200 and the bottom plate 110, is pressed against a surface of the at least one guide bar 200 assembled with the guide groove 411 (the recess). The surface of the at least one guide bar 200 which the support section 620 pressed against is facing toward the bottom plate 110. Additionally, the support section 620 is adapted to provide a pulling force along a direction perpendicular to the bottom plate 110 (or, perpendicular to the optical axis of the lens 14) and between the image sensor adjusting seat 400 and bottom plate 110. Accordingly, the image sensor adjusting seat 400 may be moved steadily. In this embodiment, the second contact spring 600 is a piece of elastic iron. However, the second contact spring 600 is, but not limited to, a piece of elastic iron.

In this and some embodiment, the focus adjusting seat 12 further comprises an elastic component 700. Two ends of the elastic component 700 are connected to the bottom seat 410 of the image sensor adjusting seat 400 and the driving device 300, respectively, to provide a pulling force along a direction parallel to the bottom plate 110 (or, parallel to the optical axis of the lens 14). Accordingly, the image sensor adjusting seat 400 may be moved steadily. In this embodiment, the elastic component 700 is a spring. However, the elastic component 700 is, but limited to, a spring. In other embodiments, the elastic component 700 may be an elastic body which is adapted to provide a pulling force.

According to the focus adjusting seat 12 of this embodiment, each axis of each guide bar 200 is parallel to the bottom plate 110 by each fixed parts 111 and each first contact spring 500. Additionally, the output screw 321 is driven to rotate by the driving device 30, so that the image sensor adjusting seat 400 comprising the screwed part 412 is driven to move along an extending direction of the axis of the guide bar 200 (parallel to the optical axis of the lens 14) by the guide groove 411 and the second contact spring 600. Accordingly, the focal length of the photographing device 10 is capable of being adjusted, and the image quality of the photographing device 10 is capable of being improved.

Furthermore, the base seat 100 is integrally formed according to the same positional reference, so that the assembly accuracy of the guide bar 20 and the image sensor adjusting seat 400 (which are disposed on the base seat 100) may be improved. Moreover, the image quality of the photographing device 10 is also improved.

Figure 5:
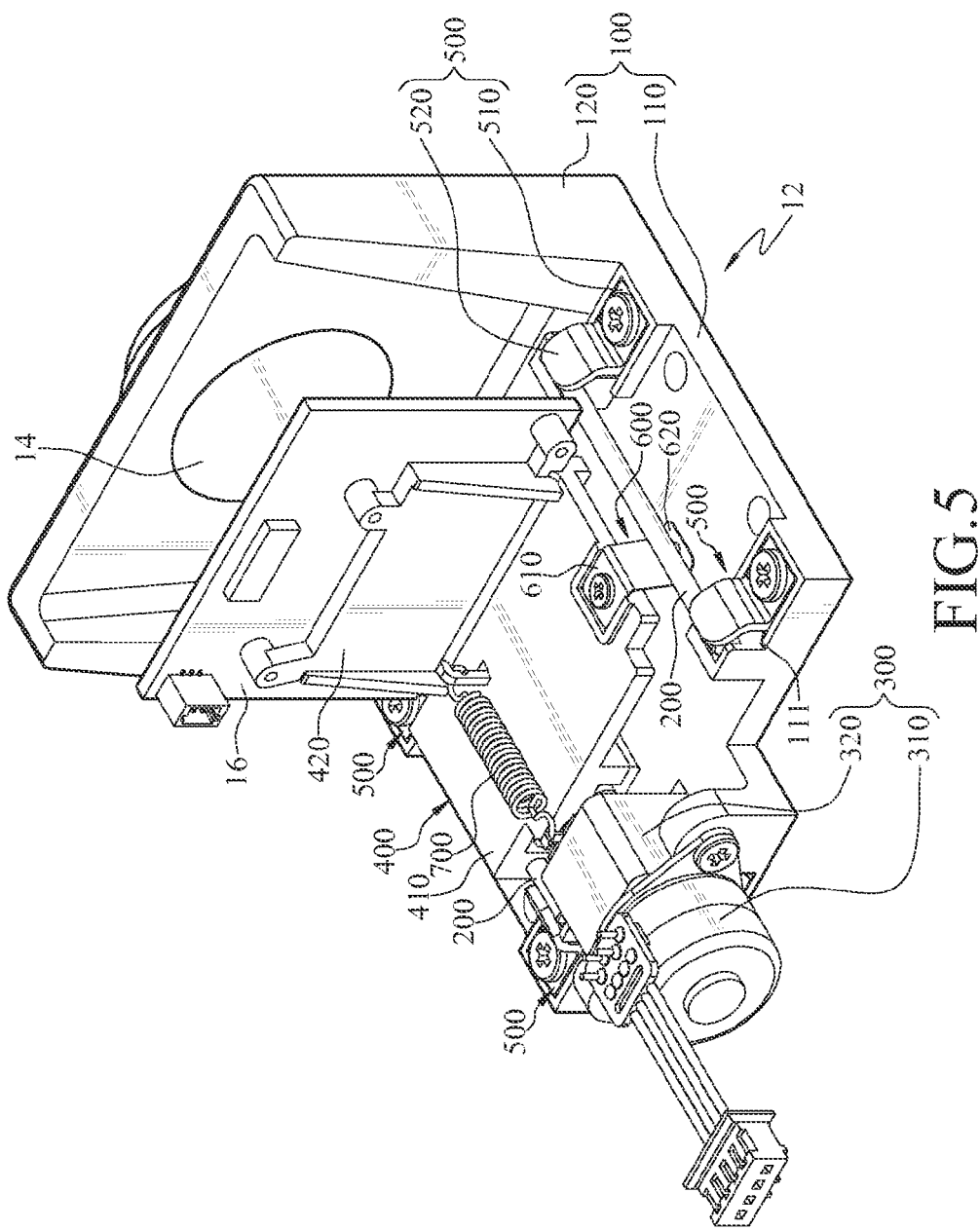
FIG. 5 is a perspective view of a focus adjusting seat according to a second embodiment of the disclosure.

Please refer to FIG. 5 which is a perspective view of a focus adjusting seat according to a second embodiment of the disclosure. In this embodiment, the structure of focus adjusting seat 12 is similar to that of the focus adjusting seat according to the first embodiment, so that only the differences between the second embodiment and the first embodiment will be described as follows.

In this embodiment, the quantity of the guide groove 411 is one. One side of the bottom seat 410 has a guide groove 411 penetrating the bottom seat 410. The other side of the bottom seat 410 does not have the guide groove 411 but is disposed on the guide bar 200 by the fixed part 111, the first contact spring 500 and the second contact spring 600.

According to the photographing device of the disclosure, the two ends of each guide bar of the focus adjusting seat are disposed on the bottom plate according to the same positional reference, so that the image sensor adjusting seat guided by the guide bar may improve the adjusting accuracy of the image sensor adjusting seat and the base seat, further improving the image quality of the photographing device.

Additionally, the bottom plate and the front plate of the base seat are also processed according to the same positional reference. Accordingly, disposed on the base seat, the assembly accuracy of the guide bar and the image sensor adjusting seat may also be improved. Thus, the image quality of the photographing device may also be improved, accordingly.

Furthermore, because the stepping motor has the deceleration gear box, the displacement accuracy of the image sensor adjusting seat may be improved accordingly. Moreover, the accuracy of focal adjusting and the image quality of the photographing device may be improved.

The disclosure will become more fully understood from the said embodiment for illustration only and thus does not limit the disclosure. Any modifications within the spirit and category of the disclosure fall in the scope of the disclosure.

What is claimed is:

1. A focus adjusting seat, comprising:
   a base seat comprising a bottom plate and a front plate, wherein the front plate is connected to the bottom plate and has a lens installation hole;
   at least one guide bar with two ends disposed on the bottom plate, respectively;
   a driving device disposed on the bottom plate and having an output screw; and
   an image sensor adjusting seat comprising a bottom seat and an image sensor installation part, wherein the image sensor installation part is connected to the bottom seat and faces toward the lens installation hole, the bottom seat has a screwed part and at least one guide groove, the output screw is screwed to the screwed part, the at least one guide groove is movably assembled with the at least one guide bar, and the driving device is adapted to adjust a relative position between the image sensor adjusting seat and the lens installation hole, accordingly.

2. The focus adjusting seat according to claim 1, further comprising four first contact springs each having a first fixed section and a pressed section, wherein the quantity of the at least one guide bar is two, the bottom plate has four fixed parts, the four first fixed sections are disposed on the four fixed parts respectively, the two ends of each guide bar are interposed between each pressed section and each fixed part respectively, the quantity of the at least one guide groove is two, and the two guide grooves are movably assembled with the two guide bars respectively.

3. The focus adjusting seat according to claim 1, further comprising two first contact springs each having a first fixed section and a pressed section, wherein the bottom plate has two fixed parts, the two first fixed sections are disposed on the two fixed parts respectively, and the two ends of the at least one guide bar are interposed between each pressed section and each fixed part, respectively.

4. The focus adjusting seat according to claim 3, further comprising a second contact spring having a second fixed section and a support section, wherein the second fixed section is disposed on the bottom seat, the support section located between the at least one guide bar and the bottom plate is pressed against a surface of the at least one guide bar which faces toward the bottom plate.

5. The focus adjusting seat according to claim 4, further comprising an elastic component with two ends being connected to the bottom seat and the driving device, respectively.

6. The focus adjusting seat according to claim 5, wherein the elastic component is a spring.

7. The focus adjusting seat according to claim 1, wherein the driving device comprises a stepping motor adapted to drive the output screw to rotate and adjust the relative position between the image sensor adjusting seat and the lens installation hole by the screwed part.

8. The focus adjusting seat according to claim 7, wherein the driving device comprises a deceleration gear box disposed between the stepping motor and the output screw, and the stepping motor is adapted to drive the deceleration gear box to rotate, such that the output screw is driven to rotate accordingly.

9. The focus adjusting seat according to claim 1, wherein the bottom plate and the front plate are formed integrally into a single unit.

10. A photographing device, comprising:
    a focus adjusting seat according to claim 1; and
    an image sensor disposed on a surface of the image sensor installation part of the focus adjusting seat, wherein the surface of the image sensor installation part faces toward the front plate.

11. The photographing device according to claim 10, further comprising a lens detachably disposed at the lens installation hole of the focus adjusting seat.

12. The photographing device according to claim 10, wherein the focus adjusting seat further comprises four first contact springs each having a first fixed section and a pressed section, wherein the quantity of the at least one guide bar is two, the bottom plate has four fixed parts, the four first fixed sections are disposed on the four fixed parts respectively, the two ends of each guide bar are interposed between each pressed section and each fixed part respectively, the quantity of the at least one guide groove is two, and the two guide grooves are movably assembled with the two guide bars respectively.

13. The photographing device according to claim 10, wherein the focus adjusting seat further comprises two first contact springs each having a first fixed section and a pressed section, wherein the bottom plate has two fixed parts, the two first fixed sections are disposed on the two fixed parts respectively, and the two ends of the at least one guide bar are interposed between each pressed section and each fixed part, respectively.

14. The photographing device according to claim 13, wherein the focus adjusting seat further comprises a second contact spring having a second fixed section and a support section, wherein the second fixed section is disposed on the bottom seat, the support section located between the at least one guide bar and the bottom plate is pressed against a surface of the at least one guide bar which faces toward the bottom plate.

15. The photographing device according to claim 14, wherein the focus adjusting seat further comprises an elastic component with two ends being connected to the bottom seat and the driving device, respectively.

16. The photographing device according to claim 15, wherein the elastic component is a spring.

17. The photographing device according to claim 10, wherein the driving device comprises a stepping motor adapted to drive the output screw to rotate and adjust the relative position between the image sensor adjusting seat and the lens installation hole by the screwed part.

18. The photographing device according to claim 17, wherein the driving device comprises a deceleration gear box disposed between the stepping motor and the output screw, and the stepping motor is adapted to drive the deceleration gear box to rotate, such that the output screw is driven to rotate accordingly.

19. The photographing device according to claim 10, wherein the bottom plate and the front plate are formed integrally into a single unit.

* * * * *